(12) United States Patent
Naito et al.

(10) Patent No.: US 7,788,327 B2
(45) Date of Patent: Aug. 31, 2010

(54) DEVICE, PROGRAM AND METHOD FOR ASSISTING IN PREPARING EMAIL

(75) Inventors: Eiichi Naito, Kyota (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 1013 days.

(21) Appl. No.: 11/137,984

(22) Filed: May 26, 2005

(65) Prior Publication Data

US 2005/0210115 A1 Sep. 22, 2005

Related U.S. Application Data

(63) Continuation of application No. PCT/JP03/15118, filed on Nov. 26, 2003.

(30) Foreign Application Priority Data

Nov. 28, 2002 (JP) ............... 2002-345654

(51) Int. Cl.
G06F 15/16 (2006.01)
G06F 17/28 (2006.01)
(52) U.S. Cl. ............... 709/206; 709/204; 709/205; 709/207; 715/200; 715/256; 715/261
(58) Field of Classification Search ......... 709/204–207; 715/200, 256, 261
See application file for complete search history.

(56) References Cited

U.S. PATENT DOCUMENTS

| | | | |
|---|---|---|---|
| 6,338,065 B1 | 1/2002 | Takahashi et al. | |
| 6,829,607 B1 * | 12/2004 | Tafoya et al. | 707/6 |
| 7,013,427 B2 * | 3/2006 | Griffith | 715/201 |
| 2003/0074409 A1 * | 4/2003 | Bentley | 709/206 |
| 2003/0105827 A1 * | 6/2003 | Tan et al. | 709/206 |

FOREIGN PATENT DOCUMENTS

JP 60-147868 A 8/1985

(Continued)

OTHER PUBLICATIONS

"Sametime 3.0 User's Guide"; IBM Corporation; pp. 29-31 and 56-58; [online]; Jul. 16, 2002.

*Primary Examiner*—William C Vaughn, Jr.
*Assistant Examiner*—Carlos R Perez Toro
(74) *Attorney, Agent, or Firm*—Harness, Dickey & Pierce, P.L.C.

(57) ABSTRACT

An email preparation assisting device automatically produces human-relations information about human relations with a recipient to whom an email is to be sent. In order to realize this, term extraction member extracts terms from emails stored in a sent/received email storing section. Term usage frequency calculation member calculates the usage frequency of each extracted term, and adds it to the usage frequency of the term stored in a term usage frequency storing section. Human-relations information producing member weights human-relations basic information associated in advance with each term in a term association list for each communication partner with the usage frequency of the term for the communication partner stored in the term usage frequency storing section to produce human-relations information based on the result of the weighting operation. The produced human-relations information is stored in a human-relations information storing section separately for each communication partner.

10 Claims, 15 Drawing Sheets

FOREIGN PATENT DOCUMENTS

| | | |
|---|---|---|
| JP | 63-018457 A | 1/1988 |
| JP | 03-201163 A | 9/1991 |
| JP | 07-160708 A | 6/1995 |
| JP | 10-301905 A | 11/1998 |
| JP | 11-085641 A | 3/1999 |
| JP | 11-338863 A | 12/1999 |
| JP | 2000-020538 A | 1/2000 |
| JP | 2000-048018 A | 2/2000 |
| JP | 2000-148753 A | 5/2000 |
| JP | 2000-172587 A | 6/2000 |
| JP | 2001-522500 A | 11/2001 |
| JP | 2002-108768 A | 4/2002 |
| JP | 2002-215642 A | 8/2002 |
| JP | 2002-222145 A | 8/2002 |
| JP | 2002-297502 A | 10/2002 |
| WO | WO-99/44152 | 9/1999 |
| WO | WO-02/05084 A2 | 1/2002 |

* cited by examiner

| Communication partner | Communication direction | Time | Subject | Contents |
|---|---|---|---|---|
| A | Send | X/X/X X:X:X | 会議の件 | A様<br>○○の×です。<br>いつもお世話になっております。<br>△△の会議の件、下記日程で行いますので、… |
| A | Receive | X/X/X X:X:X | Re:会議の件 | ×さん<br>○○の△です。<br>△△の会議の件、了承いたしました。<br>よろしくお願いいたします。 |
| B | Receive | X/X/X X:X:X | テニスしない? | Bです。<br>しばらく会ってないけど、元気?<br>気候が良くなってきたよね。またテニスしない?<br>… |
| B | Send | X/X/X X:X:X | Re:テニスしない? | ×です。<br>テニスですか。いいですね。<br>この間バイクに乗っているときに<br>チョームかゴっかことがありまして… |
| … | … | … | … | … |

| Communication partner | Communication direction | Time | Subject | Contents |
|---|---|---|---|---|
| A | Send | X/X/X X:X:X | Meeting | Dear Mr. A,<br>Thank you for your prompt reply.<br>Regarding our next meeting schedule, I would suggest the following dates...<br>Sincerely yours, |
| A | Receive | X/X/X X:X:X | Re:Meeting | Dear Mr. X,<br>I took a note of the meeting schedule.<br>Thank you,<br>Best regards, |
| B | Receive | X/X/X X:X:X | How about tennis? | Hi X,<br>Long time no see! What's up?<br>The weather became just great.<br>How about going to play tennis? |
| B | Send | X/X/X X:X:X | Re:How about tennis? | Dear B,<br>Tennis would be really nice.<br>Unfortunately, since I had the bike accident, I have not played too often... |
| ... | ... | ... | ... | ... |

FIG. 4

| Communication partner | Communication direction | Time | Subject | Contents |
|---|---|---|---|---|
| A | Send | x/x/x x:x:x | 关于会议 | A先生<br>我是○○的小×。<br>常常受到你的照顾。<br>按以下日程举行△△会议，… |
| A | Receive | x/x/x x:x:x | Re:关于会议 | ×先生<br>我是○○的A。<br>有关△△会议的事情，我已经明白了。<br>请多多指教。 |
| B | Receive | x/x/x x:x:x | 一起打网球吧 | 我是B。<br>好久不见，你很好吗？<br>天气已经转好，再去打网球吧？<br>… |
| B | Send | x/x/x x:x:x | Re:打网球吧 | 我是×。<br>打网球吗，很好啊。<br>前几天，我骑摩托车的时候，发生了一件让我极其恼火的事情…。 |
| ... | ... | ... | ... | ... |

| Communication partner | Communication direction | Term usage frequency | |
|---|---|---|---|
| | | Term | Frequency |
| A | Send | 様 | 12 |
| | | です | 156 |
| | | お世話になっております | 5 |
| | | 会議 | 4 |
| | | ⋮ | ⋮ |
| A | Receive | さん | 8 |
| | | ます | 34 |
| | | お世話になっております | 3 |
| | | 会議 | 4 |
| | | ⋮ | ⋮ |
| B | Send | よね | 2 |
| | | テニス | 7 |
| | | バイク | 13 |
| | | ⋮ | ⋮ |
| B | Receive | です | 32 |
| | | テニス | 6 |
| | | バイク | 10 |
| | | ⋮ | ⋮ |
| ⋮ | ⋮ | ⋮ | |

| Communication partner | Communication direction | Term usage frequency ||
|---|---|---|---|
| | | Term | Frequency |
| A | Send | Mr./Mrs. | 12 |
| | | Dear | 156 |
| | | I am sorry | 5 |
| | | Meeting | 4 |
| | | : | : |
| A | Receive | Mr./Ms. | 8 |
| | | Dear | 34 |
| | | I am sorry | 3 |
| | | Meeting | 4 |
| | | : | : |
| B | Send | Hi | 2 |
| | | Tennis | 7 |
| | | Motorbike | 13 |
| | | : | : |
| B | Receive | Dear | 32 |
| | | Tennis | 6 |
| | | Motorbike | 10 |
| | | : | : |
| : | : | : | |

| Term | Human-relations basic information | | |
|---|---|---|---|
| | Senior-Junior Degree | Friendliness Degree | Business Degree |
| 殿 | 0.5 | −0.1 | 0.7 |
| 様 | 0.1 | 0 | 0.2 |
| さん | 0 | 0.1 | 0 |
| 君 | −0.2 | 0.1 | 0.1 |
| です | 0.1 | 0 | 0 |
| ます | 0.2 | −0.2 | 0.1 |
| お世話になっております | 0.2 | −0.2 | 0.8 |
| ⋮ | ⋮ | ⋮ | ⋮ |

| Term | Human-relations basic information | | |
|---|---|---|---|
| | Senior-Junior Degree | Friendliness Degree | Business Degree |
| Sincerely Yours | 0.5 | −0.1 | 0.7 |
| Best Regards | 0.1 | 0 | 0.2 |
| Regards | 0 | 0.1 | 0 |
| Best | −0.2 | 0.1 | 0.1 |
| Dear | 0.1 | 0 | 0 |
| Would/should | 0.2 | −0.2 | 0.1 |
| I apologize for... | 0.2 | −0.2 | 0.8 |
| ⋮ | ⋮ | ⋮ | ⋮ |

| Communication partner | Human-relations infomation | | |
|---|---|---|---|
| | Senior-Junior Degree | Friendliness Degree | Business Degree |
| A | 0.12 | −0.28 | 0.52 |
| B | 0.36 | 0.22 | 0.08 |
| ⋮ | ⋮ | ⋮ | ⋮ |

| Communication partner | Human-relations infomation | | |
|---|---|---|---|
| | Senior-Junior Degree | Friendliness Degree | Business Degree |
| A | 0.12 | −0.28 | 0.52 |
| B | 0.36 | 0.22 | 0.08 |
| ⋮ | ⋮ | ⋮ | ⋮ |

| Condition of human-relations information | | | Additional information (conventional phrase) |
|---|---|---|---|
| Senior-Junior Degree | Friendliness Degree | Business Degree | |
| >0 | - | >0.5 | Very truly yours |
| - | >0.2 | <0.1 | Best |
| ⋮ | ⋮ | ⋮ | ⋮ |

| Condition of human-relations information | | | Additional information (decoration information) |
|---|---|---|---|
| Senior-Junior Degree | Friendliness Degree | Business Degree | |
| >0.1 | <0.4 | >0.3 | a.gif |
| - | >0.4 | <0 | b.gif |
| ⋮ | ⋮ | ⋮ | ⋮ |

| Condition of human-relations information ||| Character conversion dictionary |
|---|---|---|---|
| Senior-Junior Degree | Friendliness Degree | Business Degree | |
| >0 | – | >0.5 | c.dic |
| – | >0.2 | <0.1 | d.dic |
| ⋮ | ⋮ | ⋮ | ⋮ |

FIG. 17

Conversion candidates for partner A

| Yoroshiku onegai shimasu |
|---|
| Youji |
| Youyaku |
| Yotei |
| Youbi |
| ⋮ |

Conversion candidates for partner B

| Yoroshiku |
|---|
| Yoppodo |
| Yokatta |
| Yonde |
| Yoyaku |
| ⋮ |

43

| Communication partner | Common term | Degree of commonness |
|---|---|---|
| A | meeting | 0.023 |
|   | : | : |
| B | tennis | 0.017 |
|   | motorbike | 0.056 |
|   | : | : |
| . . . | . . . | . . . |

Company X releases a new large motorcycle

Details  Let Mr. B know

| Communication partner | Unique term | Frequency |
|---|---|---|
| B | burns me up to the max | 11 |
|   | bummer | 3 |
|   | ⋮ | ⋮ |
| ⋮ | ⋮ | |

DEVICE, PROGRAM AND METHOD FOR ASSISTING IN PREPARING EMAIL

CROSS REFERENCE TO RELATED APPLICATIONS

This is a continuation of Application PCT/JP2003/15118, filed on Nov. 26, 2003. This Non-provisional application claims priority under 35 U.S.C. §119(a) on Patent Application No. 2002-345654 filed in Japan on Nov. 28, 2002, the entire contents of which are hereby incorporated by reference.

BACKGROUND ART

The present invention relates to a user operation assisting technique for assisting a user in operating an information processing device such as a computer, and more particularly to a technique suitable for assisting a user in preparing an email.

In recent years, text-based telecommunications systems such as email and chat have been commonly used. Particularly, exchanging emails using a personal computer or a PDA has become indispensable in modern business situations and exchanging information between friends.

Email, as opposed to voice-based telecommunications systems such as telephones, is characteristic in that a user can send information to the recipient, or receive and view information therefrom, at any time of the user's convenience. Other advantages include the user not having to take a note of information.

The address book function enhances the convenience of email. A user can easily obtain an email address of a recipient to whom the user is sending an email. A user can also register information of a recipient in the user's address book by referring to the content of a received email. In order to reduce the burden on the user, a technique has been proposed in the prior art (see, for example, Patent Document 1) for automatically extracting from received emails, and registering in the address book, particular text strings representing telephone numbers and email addresses.

As a technique for assisting the user in preparing a body text of an email, there has been proposed in the art a technique in which the user categorizes in advance recipients to which the user sends emails into different groups, so that when the user prepares an email, a list of sentences that are appropriate for the relevant category are presented to the user (see, for example, Patent Document 2).

(Patent Document 1) Japanese Laid-Open Patent Publication No. 2000-172587

(Patent Document 2) Japanese Laid-Open Patent Publication No. 2000-148753

However, as for information about human relations with a recipient such as the senior-junior relationship or the friendliness degree with the recipient (human-relations information), the user themselves needs to make decisions and register the information. Since human relations of a user with others change over time, and the user carries the burden of having to update the registered information each time such change occurs.

As for preparing an email, the user themselves needs to compose and manually input sentences. Therefore, the user carries a heavy burden of selecting a locution and decoration information that are appropriate for the recipient. Particularly, with a small-sized terminal such as a portable telephone, having a small display screen and a less convenient text input method, the user carries a heavier burden of inputting a body text.

With the technique described in Patent Document 2, supra, while it may be possible to reduce the user's burden of inputting text when preparing an email, it is still time-consuming to register human relations for each email recipient. Moreover, human relations are usually not so simple that a user can simply register a recipient as a superior or a subordinate, or as a friend or a non-friend, and the relationship differs from one email recipient to another, whereby it is difficult to appropriately register a recipient in a category.

In view of the problems set forth above, it is an object of the present invention to provide a device, a computer program and a method for assisting a user in preparing an email, which are capable of automatically producing human-relations information for each email recipient. It is also an object of the present invention to provide a device, a computer program and a method for assisting a user in preparing an email, which are capable of appropriately assisting a user in preparing an email according to a recipient to whom the email is to be sent.

SUMMARY OF THE INVENTION

In order to solve the problems set forth above, the present invention provides an email preparation assisting device for assisting in preparing an email including: term extraction member for extracting a term from electronic text data of a communications session with a recipient to whom the email is to be sent; term usage frequency calculation member for calculating a usage frequency, in the electronic text data, of each term extracted by the term extraction member; and human-relations information producing member that refers to a term association list in which each term is associated with human-relations basic information defined by at least one of a senior-junior degree and other human-relations-related measures to weight human-relations basic information associated with the term extracted by the term extraction member with the usage frequency calculated by the term usage frequency calculation member and to produce human-relations information for the recipient based on a result of the weighting operation.

With the present invention, the usage frequency of each term in electronic text data of a communications session with a recipient to whom an email is to be sent is calculated, and it is possible to automatically produce human-relations information for the recipient based on the usage frequency. This eliminates the need for the user themselves to register human-relations information with each recipient, thus reducing the burden on the user.

It is preferred that when a new communications session is performed with the recipient, the term usage frequency calculation member calculates a usage frequency, in electronic text data of the new communications session, of each term extracted by the term extraction member from the electronic text data, and adds the calculation result to the usage frequency of the term thus far. Thus, as more communications sessions are had with a recipient, the human-relations information for the recipient can be updated for a higher precision.

It is preferred that the email preparation assisting device of the present invention includes: a term usage frequency storing section for storing, separately for each communication recipient, the usage frequency of each term calculated by the term usage frequency calculation member while associating the usage frequency with the term; and a human-relations information storing section for storing, separately for each communication recipient, the human-relations information produced by the human-relations information producing member.

It is preferred that the email preparation assisting device of the present invention includes: human-relations information extraction member for extracting human-relations information for the recipient to whom the email is to be sent, from the human-relations information produced by the human-relations information producing member and stored separately for each communication recipient; and assisting member for assisting in preparing the email to the recipient based on the human-relations information extracted by the human-relations information extraction member.

Thus, it is possible to change the way of assisting in preparing an email according to the recipient to whom the email is to be sent, i.e., to provide an assistance suitable for each recipient, based on the human-relations information automatically produced by the human-relations information producing member and stored.

In one embodiment, the assisting member refers to an additional information association list in which a conventional phrase, decoration information and other additional information to be added to an email are each associated with a condition about at least one of the measures to suggest additional information that is associated with the condition satisfied by the human-relations information extracted by the human-relations information extraction member.

In one embodiment, the assisting member refers to a term association list in which each term is associated with human-relations basic information defined by at least one of the measures to calculate a distance between the human-relations basic information associated with each term included in a prepared email and the human-relations information extracted by the human-relations information extraction member so as to determine appropriateness of the term included in the prepared email based on a magnitude relationship between the distance and a predetermined threshold value.

In one embodiment, the assisting member refers to a character conversion dictionary association list in which each character conversion dictionary is associated with a condition about at least one of the measures to select a character conversion dictionary associated with the condition satisfied by the human-relations information extracted by the human-relations information extraction member.

The present invention also provides an email preparation assisting device for assisting in preparing an email, including: human-relations information extraction member for extracting human-relations information for a recipient to whom the email is to be sent, from human-relations information defined by at least one of a senior-junior degree and other human-relations-related measures and stored separately for each communication recipient; and additional information suggesting member that refers to an additional information association list in which a conventional phrase, decoration information and other additional information to be added to an email are each associated with a condition about at least one of the measures to suggest additional information that is associated with the condition satisfied by the human-relations information extracted by the human-relations information extraction member.

With this invention, when a user prepares an email, it is possible to suggest, to the user, additional information that is most suitable for the recipient to whom the email is to be sent. Thus, it is possible to reduce the burden on the user of selecting additional information such as a conventional phrase or decoration information.

The present invention also provides an email preparation assisting device for assisting in preparing an email, including: human-relations information extraction member for extracting human-relations information for a recipient to whom the email is to be sent, from human-relations information defined by at least one of a senior-junior degree and other human-relations-related measures and stored separately for each communication recipient; and term appropriateness determination member that refers to a term association list in which each term is associated with human-relations basic information defined by at least one of the measures to calculate a distance between the human-relations basic information associated with each term included in a prepared email and the human-relations information extracted by the human-relations information extraction member so as to determine appropriateness of the term included in the prepared email based on a magnitude relationship between the distance and a predetermined threshold value.

With this invention, when a user prepares an email, it is determined whether or not terms most suitable for the recipient to whom the email is to be sent are being used. Thus, it is possible to reduce the burden on the user of determining the appropriateness of the terms being used in the prepared email.

The present invention also provides an email preparation assisting device for assisting in preparing an email, including: human-relations information extraction member for extracting human-relations information for a recipient to whom the email is to be sent, from human-relations information defined by at least one of a senior-junior degree and other human-relations-related measures and stored separately for each communication recipient; and dictionary selection member that refers to a character conversion dictionary association list in which each character conversion dictionary is associated with a condition about at least one of the measures to select a character conversion dictionary associated with the condition satisfied by the human-relations information extracted by the human-relations information extraction member.

With this invention, when a user prepares an email, a character conversion dictionary most suitable for the recipient to whom the email is to be sent is selected. Thus, the character string conversion accuracy is improved, thus reducing the burden on the user of inputting characters.

It is preferred that the measures defining the human-relations information are given in numerical values.

The present invention also provides an email preparation assisting device for assisting in preparing an email, including: term extraction member for extracting a term from electronic text data of a communications history in the past with a recipient to whom the email is to be sent; and term usage frequency calculation member for calculating a usage frequency, in the electronic text data, of each term extracted by the term extraction member.

With this invention, it is possible to obtain the usage frequency of each term that has been used in communications sessions between the user and a recipient to whom an email is to be sent. The term usage frequency can be used as basic information for providing a most suitable assistance depending on the recipient to whom an email is to be sent.

It is preferred that the email preparation assisting device includes a term usage frequency storing section for storing, separately for each communication recipient, the usage frequency of each term calculated by the term usage frequency calculation member while associating the usage frequency with the term.

It is preferred that the email preparation assisting device includes common term extraction member for calculating a usage rate, in a communications history with the recipient, of each term extracted by the term extraction member based on the usage frequency calculated by the term usage frequency calculation member to extract, as a common term for the recipient, each of the terms extracted by the term extraction member whose usage rate is equal to or greater than a predetermined value.

In one embodiment, the term extraction member extracts terms from emails that have been sent to the recipient or received therefrom.

It is preferred that the email preparation assisting device includes information searching member for searching information by using, as a search condition, at least one of common terms extracted by the common term extraction member, wherein if the information search with the search condition is successful, the information searching member suggests a user to prepare an email for notifying the recipient of the search result.

It is preferred that the email preparation assisting device includes a term usage frequency storing section for storing, separately for each communication recipient, the usage frequency of each term calculated by the term usage frequency calculation member while associating the usage frequency with the term; and a common term storing section for storing each common term extracted by the common term extraction member while associating the common term with the usage rate thereof calculated by the common term extraction member.

The present invention provides an email preparation assisting device for assisting in preparing an email, including: unique term extraction member for extracting, from electronic text data of a communications history in the past with a recipient to whom the email is to be sent, a unique term that is not registered in a dictionary used by the email preparation assisting device; unique term usage frequency calculation member for calculating a usage frequency, in the electronic text data, of each unique term extracted by the unique term extraction member; and input character conversion member for converting a character or character string input by a user to a new character or character string. Herein, the input character conversion member places a unique term having a relatively higher usage frequency as calculated by the unique term usage frequency calculation member in a relatively upper place among conversion candidates.

With this invention, the usage frequency of each unique term in electronic text data of the communications history with a recipient to whom an email is to be sent is calculated, and it is possible to automatically produce unique term information for the recipient based on the usage frequency. This eliminates the need for the user themselves to register unique term information for each recipient, thus reducing the burden on the user of inputting characters when preparing an email.

It is preferred that the various members in the email preparation assisting device of the present invention each function as an email preparation assisting program by using a hardware resource such as a computer.

The present invention also provides an email preparation assisting method for assisting in preparing an email, including: a term extraction step of extracting a term from electronic text data of a communications session with a recipient to whom the email is to be sent; a term usage frequency calculation step of calculating a usage frequency, in the electronic text data, of the term extracted by the term extraction step; a weighting step of referring to a term association list in which each term is associated with human-relations basic information defined by at least one of a senior-junior degree and other human-relations-related measures to weight human-relations basic information associated with the term extracted by the term extraction step with the usage frequency calculated by the term usage frequency calculation step; and a human-relations information producing step of producing human-relations information for the recipient based on a result of the weighting step.

It is preferred that when a new communications session is performed with the recipient, the term usage frequency calculation step calculates a usage frequency, in electronic text data of the new communications session, of each term extracted by the term extraction step from the electronic text data, and adds the calculation result to the usage frequency of the term thus far.

The present invention also provides an email preparation assisting method for assisting in preparing an email, including: a human-relations information extraction step of extracting human-relations information for a recipient to whom the email is to be sent, from human-relations information defined by at least one of a senior-junior degree and other human-relations-related measures and stored separately for each communication recipient; and an additional information suggesting step of referring to an additional information association list in which a conventional phrase, decoration information and other additional information to be added to an email are each associated with a condition about at least one of the measures to suggest additional information that is associated with the condition satisfied by the human-relations information extracted by the human-relations information extraction step.

The present invention also provides an email preparation assisting method for assisting in preparing an email, including: a human-relations information extraction step of extracting human-relations information for a recipient to whom the email is to be sent, from human-relations information defined by at least one of a senior-junior degree and other human-relations-related measures and stored separately for each communication recipient; a distance calculation step of referring to a term association list in which each term is associated with human-relations basic information defined by at least one of the measures to calculate a distance between the human-relations basic information associated with each term included in a prepared email and the human-relations information extracted by the human-relations information extraction step; and a term appropriateness determination step of determining appropriateness of the term included in the prepared email based on a magnitude relationship between the distance calculated by the distance calculation step and a predetermined threshold value.

The present invention also provides an email preparation assisting method for assisting in preparing an email, including: a human-relations information extraction step of extracting human-relations information for a recipient to whom the email is to be sent, from human-relations information defined by at least one of a senior-junior degree and other human-relations-related measures and stored separately for each communication recipient; and a dictionary selection step of referring to a character conversion dictionary association list in which each character conversion dictionary is associated with a condition about at least one of the measures to select a character conversion dictionary associated with the condition satisfied by the human-relations information extracted by the human-relations information extraction step.

It is preferred that the measures defining the human-relations information are given in numerical values.

The present invention also provides an email preparation assisting method for assisting in preparing an email, including: a term extraction step of extracting a term from electronic text data of a communications history in the past with a recipient to whom the email is to be sent; and a term usage frequency calculation step of calculating a usage frequency, in the electronic text data, of the term extracted by the term extraction step.

It is preferred that the email preparation assisting method includes a common term extraction step of calculating a usage rate, in a communications history with the recipient, of each term extracted by the term extraction step based on the usage frequency calculated by the term usage frequency calculation step to extract, as a common term for the recipient, each of the terms extracted by the term extraction step whose usage rate is equal to or greater than a predetermined value.

In one embodiment, the term extraction step extracts terms from emails that have been sent to the recipient or received therefrom.

It is preferred that the email preparation assisting method includes an information searching step of searching information by using, as a search condition, at least one of common terms extracted by the common term extraction step, wherein if the information search with the search condition is successful, the information searching step suggests a user to prepare an email for notifying the recipient of the search result.

The present invention provides an email preparation assisting method for assisting in preparing an email, including: a unique term extraction step of extracting, from electronic text data of a communications history in the past with a recipient to whom the email is to be sent, a unique term that is not registered in a dictionary used when the email preparation assisting method is carried out; a unique term usage frequency calculation step of calculating a usage frequency, in the electronic text data, of each unique term extracted by the unique term extraction step; and an input character conversion step of converting a character or character string input by a user to a new character or character string. Herein, the input character conversion step places a unique term having a relatively higher usage frequency as calculated by the unique term usage frequency calculation step in a relatively upper place among conversion candidates.

With this invention, the usage frequency of each unique term in electronic text data of the communications history with a recipient to whom an email is to be sent is calculated, and it is possible to automatically produce unique term information for the recipient based on the usage frequency. This eliminates the need for the user themselves to register unique term information for each recipient, thus reducing the burden on the user of inputting characters when preparing an email.

The present invention also provides a human-relations information producing method for producing human-relations information about human relations with another person, including: a term extraction step of extracting a term from electronic text data of a communications session with the person; a term usage frequency calculation step of calculating a usage frequency, in the electronic text data, of the term extracted by the term extraction step; a weighting step of referring to a term association list in which each term is associated with human-relations basic information defined by at least one of a senior-junior degree and other human-relations-related measures to weight human-relations basic information associated with the term extracted by the term extraction step with the usage frequency calculated by the term usage frequency calculation step; and a human-relations information producing step of producing the human-relations information based on a result of the weighting step.

BRIEF DESCRIPTION OF THE DRAWINGS

FIG. 2 shows an example of information stored in a sent/received email storing section in Japanese.

FIG. 3 shows an example of information stored in a sent/received email storing section in English.

FIG. 4 shows an example of information stored in a sent/received email storing section in Chinese.

FIG. 5 shows an example of information stored in a term usage frequency storing section in Japanese.

FIG. 6 shows an example of information stored in a term usage frequency storing section in English.

FIG. 7 shows an example of a term association list in Japanese.

FIG. 8 shows an example of a term association list in English.

FIG. 9 shows an example of information stored in a human-relations information storing section in Japanese.

FIG. 10 shows an example of information stored in a human-relations information storing section in English.

FIG. 12 shows an example of a conventional phrase association list.

FIG. 13 shows an example of a decoration information association list.

FIG. 16 shows an example of a character conversion dictionary association list.

FIG. 17 shows examples of conversion candidates displayed by input character conversion member.

DESCRIPTION OF THE PREFERRED EMBODIMENTS

Best modes for carrying out the present invention will now be described with reference to the drawings.

Figure 1:
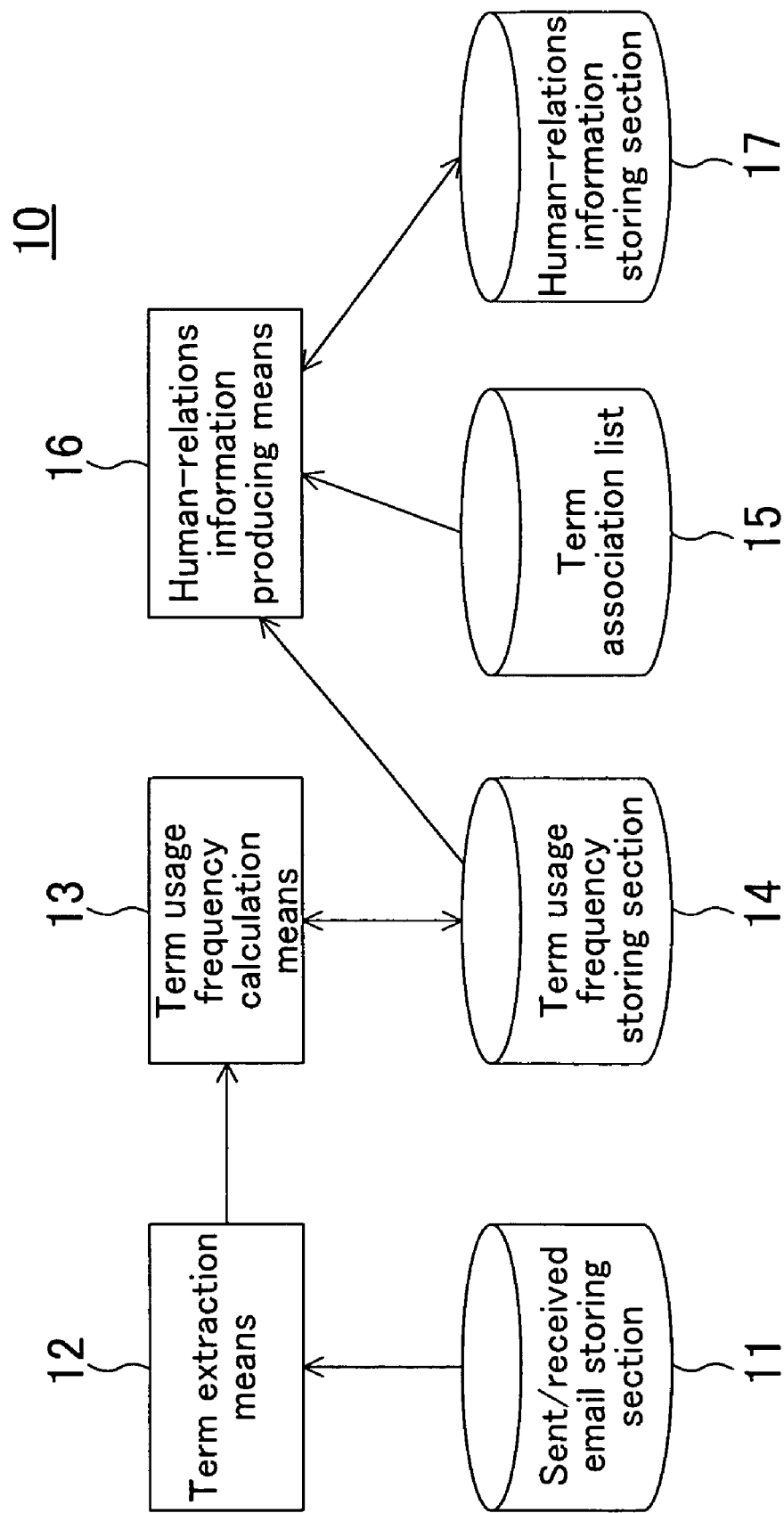
FIG. 1 is a diagram showing a configuration of an email preparation assisting device according to a first embodiment of the present invention.

FIG. 1 shows a configuration of an email preparation assisting device according to a first embodiment of the present invention. An email preparation assisting device 10 of the present embodiment includes a sent/received email storing section 11 for storing sent/received emails, term extraction member 12 for extracting terms from the emails stored in the sent/received email storing section 11, term usage frequency calculation member 13 for calculating the usage frequency of each term extracted by the term extraction member 12, a term usage frequency storing section 14 for storing the usage frequency of each term calculated by the term usage frequency calculation member 13, a term association list 15 in which each term is associated with human-relations basic information defined by at least one of a senior-junior degree and other human-relations-related measures, human-relations information producing member 16 for producing human-relations information for a communication partner, and a human-relations information storing section 17 for storing the human-relations information produced by the human-relations information producing member 16. Note that the term extraction member 12, the term usage frequency calculation member 13 and the human-relations information producing member 16 can be realized by means of either hardware or software.

The sent/received email storing section 11 stores emails sent/received by the user separately for each communication partner and separately for sent emails and received emails. FIG. 2, FIG. 3 and FIG. 4 show examples of information stored in the sent/received email storing section 11 in Japanese, in English and in Chinese, respectively.

The term extraction member 12 extracts terms used in the emails stored in the sent/received email storing section 11, and the operation thereof corresponds to the term extraction step. The extraction of terms can be performed by an ordinary method such as a morphemic analysis or parsing, for example. By using an essential term dictionary, or the like, in which particular terms are registered, for filtering, it is possible to extract only terms that are necessary for producing human-relations information to be described later. A "term" as used herein is not necessarily limited to a morpheme but includes a phrase or a special locution made up of two or more words (e.g., an expression commonly used in business situations such as "Very truly yours").

The term usage frequency calculation member 13 calculates the usage frequency of each term extracted by the term extraction member 12, and cumulatively adds it to the usage frequency of the term already stored in the term usage frequency storing section 14 separately for each communication partner and separately for sent emails and received emails, and the operation thereof corresponds to the term usage frequency calculation step. If there is no history of the term being used, the term is newly added. FIG. 5 and FIG. 6 show examples of information stored in the term usage frequency storing section 14 in Japanese and in English, respectively. The usage frequency of each term is a cumulative value from when the calculation of the usage frequency of the term was started to present. Note that the usage frequency of a term can be initialized. Thus, if the human relations between the user and a communication partner changes, for example, new human-relations information can be created anew by newly cumulatively adding, and storing, usage frequencies of terms.

The human-relations information producing member 16 produces human-relations information for each communication partner based on the usage frequencies of terms stored in the term usage frequency storing section 14 and human-relations basic information associated with each term registered in advance in the term association list 15. FIG. 7 and FIG. 8 show examples of the term association list 15 in Japanese and in English, respectively. It is herein assumed that the human-relations information is defined by three measures of the senior-junior degree, the friendliness degree and the business degree.

The senior-junior degree being higher indicates that the communication partner is more senior to the user. The friendliness degree being higher indicates that the communication partner and the user have a closer relationship with each other. The business degree being higher indicates that the relationship between the communication partner and the user is more businesslike. Note that these measures are given in numerical values.

The human-relations information producing member 16 obtains, for each email for one sending/receiving operation stored in the sent/received email storing section 11, the product between the usage frequency of each term stored in the term usage frequency storing section 14 and the human-relations basic information associated with a match with the term in the term association list 15, and obtains the average value of the product separately for each communication partner and separately for sent emails and received emails. Thus, the human-relations basic information associated with each extracted term is weighted with the usage frequency of that term, and the average value thereof is obtained separately for each communication partner and separately for sent emails and received emails. As for the senior-junior degree, the difference between the average value of the senior-junior degree for emails sent to a recipient and that for emails received therefrom is obtained, and the obtained difference is used as the senior-junior degree for that recipient. As for the friendliness degree and the business degree, the sum of the average value of each of the measures for emails sent to a recipient and that for emails received therefrom is obtained, and the obtained sums are used as the friendliness degree and the business degree for that recipient. The human-relations information producing member 16 produces the human-relations information as described above. Thus, the operation performed by the human-relations information producing member 16 corresponds to the weighting step and the human-relations information producing step.

The human-relations information storing section 17 stores the human-relations information produced by the human-relations information producing member 16 separately for each recipient. FIG. 9 and FIG. 10 show examples of information stored in the human-relations information storing section 17 in Japanese and in English, respectively. Human-relations information stored in the human-relations information storing section 17 is updated when a new communications session is performed with a recipient associated with that human-relations information. The human-relations information can be initialized.

As described above, with the present embodiment, it is possible to automatically obtain human-relations information for each recipient from the history of sent and received emails. This reduces the burden on the user of registering human-relations information. The human-relations information thus produced can be used as basic information for providing a most suitable assistance depending on the recipient to whom an email is to be sent.

While sent and received emails are used in the present embodiment, only sent emails or only received emails may be used without detracting from the effects of the present invention. While emails are stored separately for each communication partner and separately for sent emails and received emails, they may be further classified by the days of week and by time slots. Moreover, the source of information from which human-relations information is produced is not limited to emails. For example, any machine-readable electronized text data (electronic text data) can be used, including data obtained by converting sound data of telephone conversations, or the like, into text data, data obtained by converting FAX images, or the like, into text data, data obtained from a service, such as a so-called "chat", where participants can have conversations in real time via communications between computers.

The email preparation assisting device 10 does not need to include the sent/received email storing section 11, the term usage frequency storing section 14, the term association list 15 and the human-relations information storing section 17. Alternatively, these components may be provided as external storage devices. Moreover, the sent/received email storing section 11, the term usage frequency storing section 14 and the human-relations information storing section 17 may be optional. Even without these components, it is possible to produce, from an email for one sending/receiving operation, human-relations information for the recipient of that email.

While a cumulative number of times a term is used is used as the usage frequency of the term in the present embodiment, it may alternatively be the number of times it is used per unit time or per email. The usage frequency of a term may be, instead of being the number of times it is used, any other frequency indicator such as the tf/idf (term frequency/inverse document frequency) value.

While three measures of the senior-junior degree, the friendliness degree and the business degree are used as measures for defining human-relations information in the present embodiment, any other measure may be added, e.g., the love degree representing the degree of romantic attachment. While the measures are given in numerical values, they may alternatively be given in symbols denoting different levels. The human-relations information can be defined by using at least one measure, and it is not necessary to use a plurality of measures.

Figure 11:
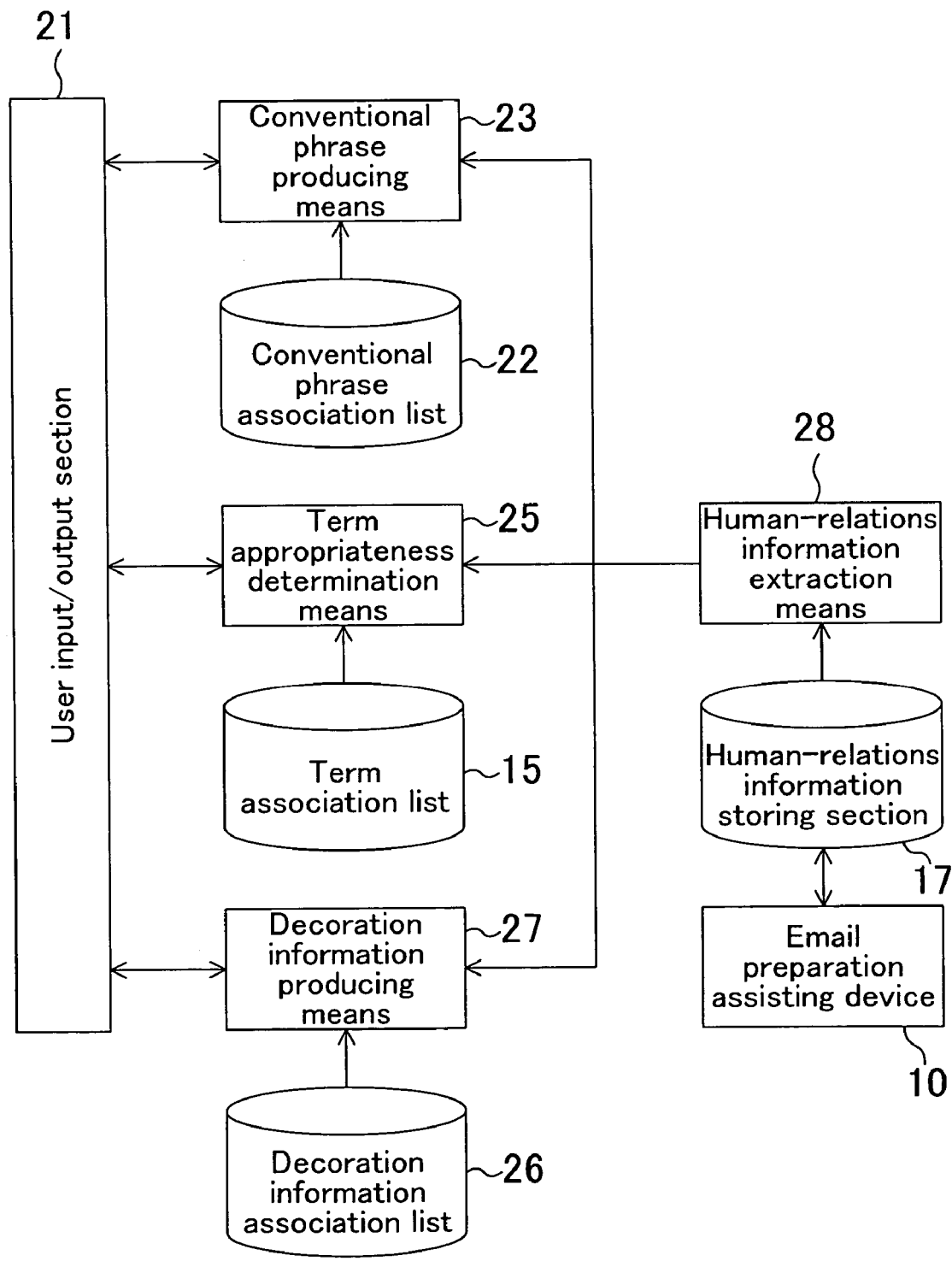
FIG. 11 is a diagram showing a configuration of an email preparation assisting device according to a second embodiment of the present invention.

FIG. 11 shows a configuration of an email preparation assisting device according to a second embodiment of the present invention. In addition to the components of the email preparation assisting device 10 of the first embodiment, an email preparation assisting device 20 of the present embodiment includes a user input/output section 21 for receiving inputs from the user and presenting a display to the user, a conventional phrase association list 22 (corresponding to the additional information association list) in which each conventional phrase is associated with a condition of the human-relations information, conventional phrase producing member 23 for producing a conventional phrase, the term association list 15, term appropriateness determination member 25 for determining whether or not each term in a prepared email is appropriate, a decoration information association list 26 (corresponding to the additional information association list) in which each decoration information to be added to an email is associated with a condition of the human-relations information, decoration information producing member 27 for producing decoration information to be added to an email, the human-relations information storing section 17, and human-relations information extraction member 28 for extracting the human-relations information of the recipient to whom an email is to be sent from the human-relations information storing section 17. Among these components, the conventional phrase producing member 23, the term appropriateness determination member 25 and the decoration information producing member 27 correspond to the assisting member. The conventional phrase producing member 23, the term appropriateness determination member 25, the decoration information producing member 27 and the human-relations information extraction member 28 can be realized by member of either hardware or software.

The user input/output section 21 accepts a user operation for preparing an email. The conventional phrase producing member 23 is activated in response to an operation requesting to produce a conventional phrase, the term appropriateness determination member 25 is activated in response to an operation requesting to make a determination on a term, and the decoration information producing member 27 is activated in response to an operation requesting to produce decoration information.

The conventional phrase producing member 23 produces conventional phrases based on the human-relations information extracted by the human-relations information extraction member 28 and based on the association between each conventional phrase and a condition of the human-relations information registered in the conventional phrase association list 22. The conventional phrase producing member 23 corresponds to the additional information suggesting member, and the operation thereof corresponds to the additional information suggesting step. FIG. 12 shows an example of the conventional phrase association list 22. In the condition section, "–" means that it can be any value. Note that the human-relations information storing section 17 stores human-relations information produced by the email preparation assisting device 10 of the first embodiment (specifically, the human-relations information producing member 16 shown in FIG. 1). This has already been described above, and will not be further described below.

The conventional phrase producing member 23 retrieves a list of conventional phrases that satisfy a condition in the conventional phrase association list 22, based on the human-relations information extracted by the human-relations information extraction member 28 for a recipient to whom an email is to be sent. For example, when preparing an email to a communication partner A (senior-junior degree=0.12, friendliness degree=−0.28, business degree=0.52), a list including a conventional phrase "Very truly yours" (senior-junior degree>0, business degree>0.5) is retrieved. When preparing an email to a communication partner B (senior-junior degree=0.36, friendliness degree=0.22, business degree=0.08), a list including a conventional phrase "Best" (friendliness degree>0.2, business degree<0.1) is retrieved. Then, the conventional phrase producing member 23 displays a list of conventional phrases via the user input/output section 21, and inserts a conventional phrase selected by the user into an email being prepared.

The term appropriateness determination member 25 retrieves, from the term association list 15, human-relations basic information associated with each term included in a prepared email (including those being prepared). Then, the distance between the retrieved human-relations basic information and the human-relations information extracted by the human-relations information extraction member 28 is calculated. Thus, the operation performed by the term appropriateness determination member 25 corresponds to the term appropriateness determination step and the distance calculation step. Note that the term association list 15 is similar to that described above in the first embodiment, and will not be further described below.

In the present embodiment, the Euclidean distance for each of the three measures of the senior-junior degree, the friendliness degree and the business degree is used as the distance between the human-relations information. If the calculated distance exceeds a predetermined threshold value, it is determined that the term included in the prepared email is inappropriate, and the determination is displayed to the user via the user input/output section 21. For example, when a closing "Best" (senior-junior degree=−0.2, friendliness degree=0.1, business degree=0.1) is used for the communication partner A (senior-junior degree=0.12, friendliness degree=−0.28, business degree=0.52), a message that "Best" is inappropriate is displayed.

Figure 14:
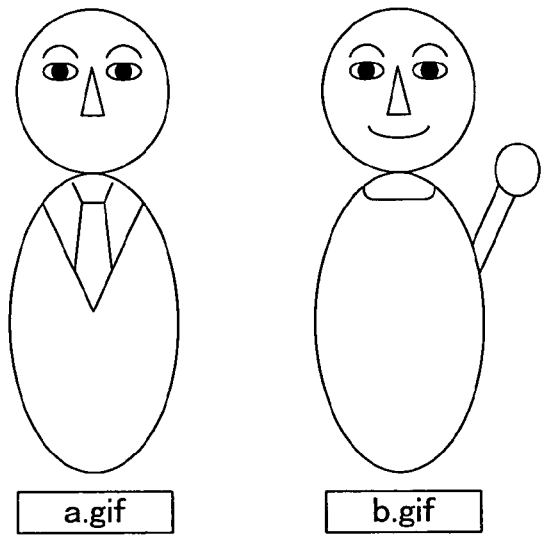
FIG. 14 shows examples of still images corresponding to file names registered in a decoration information association list.

The decoration information producing member 27 produces decoration information to be added to an email based on the human-relations information extracted by the human-relations information extraction member 28 and based on the association between each decoration information and a condition of the human-relations information registered in the decoration information association list 26. The decoration information producing member 27 corresponds to the additional information suggesting member, and the operation thereof corresponds to the additional information suggesting step. The decoration information is information for enriching the expression of an email, and includes additional information, such as a still image, a moving image, a sound or a character image, and decorative information such as the font and color of characters. In the example illustrated herein, a still image is attached. FIG. 13 shows an example of the decoration information association list 26. The decoration information association list 26 is a list in which each file name of a still image as decoration information is associated with a condition of the human-relations information. In the condition section, "−" means that it can be any value. FIG. 14 shows examples of associated still images.

The decoration information producing member 27 retrieves a list of decoration information satisfying the condition of the decoration information association list 26 based on the human-relations information extracted by the human-relations information extraction member 28 for a recipient to whom an email is to be sent. For example, when preparing an email to the communication partner A (senior-junior degree=0.12, friendliness degree=−0.28, business degree=0.52), a list including additional information "a.gif" (senior-junior degree>0.1, friendliness degree<0.4, business degree>0.3) is retrieved. When preparing an email to the communication partner B (senior-junior degree=0.36, friendliness degree=0.22, business degree=0.08), a list including additional information "b.gif" (friendliness degree>0.4, business degree<0) is retrieved. Then, the decoration information producing member 27 displays a list of decoration information to the user via the user input/output section 21, and attaches the decoration information selected by the user to the email being prepared or decorates the email according to the decoration information. Note that the operation performed by the human-relations information extraction member 28 corresponds to the human-relations information extraction step.

As described above, according to the present embodiment, it is possible to assist in preparing an appropriate email according to the recipient to whom the email is to be sent, based on the human-relations information extracted by the human-relations information extraction member 28. This reduces the burden on the user of preparing an email.

Note that the email preparation assisting device 20 does not need to include the conventional phrase association list 22, the term association list 15, the human-relations information storing section 17 and the decoration information association list 26. Alternatively, these components may be provided as external storage devices.

While two types of additional information to be added to an email, i.e., conventional phrases and decoration information, have been described in the present embodiment, the present invention is not limited thereto. Other types of additional information may be added by a method similar to that described above.

The email preparation assisting device 20 does not need to include all of the conventional phrase producing member 23, the term appropriateness determination member 25 and the decoration information producing member 27. These components can be omitted without detracting from the effects of the present invention.

Figure 15:
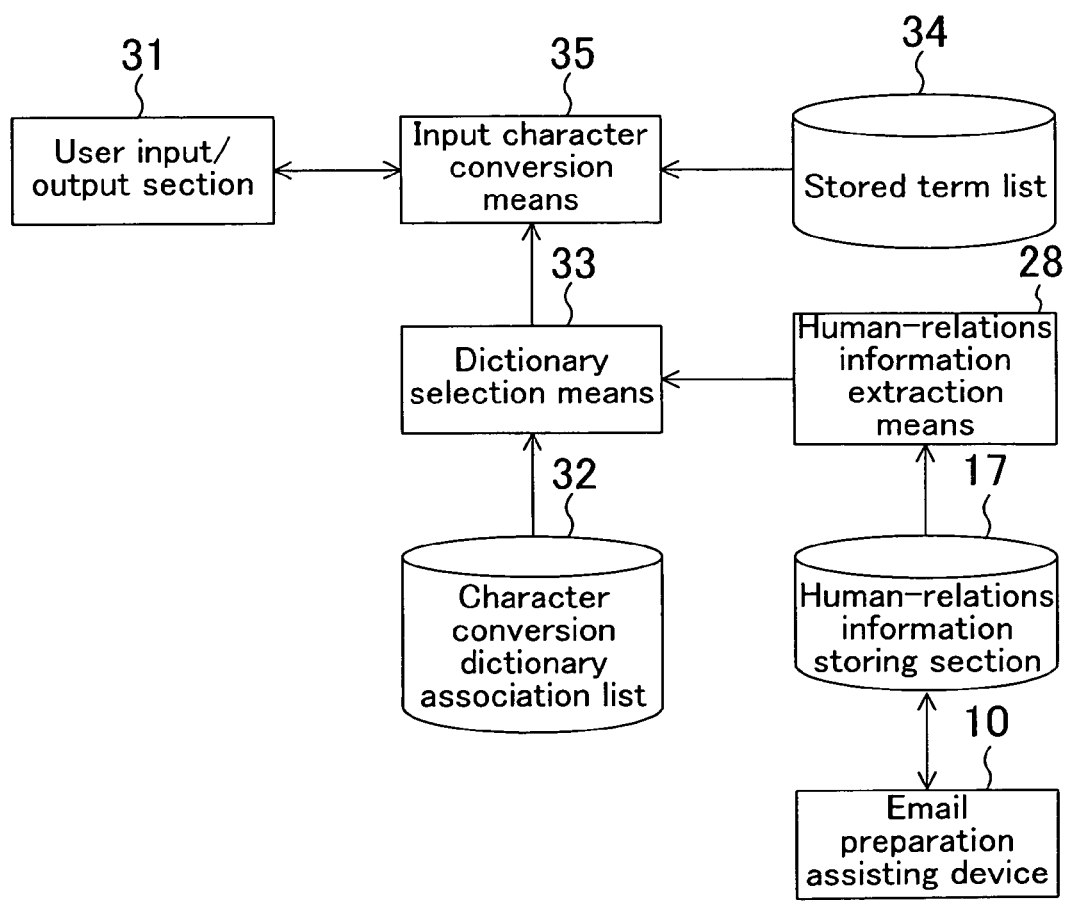
FIG. 15 is a diagram showing a configuration of an email preparation assisting device according to a third embodiment of the present invention.

FIG. 15 shows a configuration of an email preparation assisting device according to a third embodiment of the present invention. In addition to the components of the email preparation assisting device 10 of the first embodiment, an email preparation assisting device 30 of the present embodiment includes a user input/output section 31 for receiving inputs from the user and presenting a display to the user, a character conversion dictionary association list 32 in which each character conversion dictionary is associated with a condition of the human-relations information, dictionary selection member 33 for selecting a character conversion dictionary among all the character conversion dictionaries registered in the character conversion dictionary association list 32 that satisfies a predetermined condition, a stored term list 34, input character conversion member 35 for outputting a conversion candidate for an input character, the human-relations information storing section 17, and the human-relations information extraction member 28 for extracting the human-relations information for a recipient to whom an email is to be sent from the human-relations information storing section 17. Note that the dictionary selection member 33 and the input character conversion member 35 can be realized by means of either hardware or software. The human-relations information extraction member 28 is similar to that described above in the second embodiment.

The user input/output section 31 accepts a user operation for preparing an email. The input character conversion member 35 is activated in response to a character input. The email preparation process is terminated in response to a termination request.

The dictionary selection member 33 selects a character conversion dictionary to be used by the input character conversion member 35 based on the human-relations information extracted by the human-relations information extraction member 28 and based on the association between each character conversion dictionary and a condition of the human-relations information registered in the character conversion dictionary association list 32, and corresponds to the assisting member. The operation performed by the dictionary selection member 33 corresponds to the dictionary selection step. FIG. 16 shows an example of the character conversion dictionary association list 32. The character conversion dictionary association list 32 is a list in which each file name of a character conversion dictionary is associated with a condition of the human-relations information. In the condition section, "−" means that it can be any value.

The dictionary selection member 33 selects a character conversion dictionary satisfying the condition in the character conversion dictionary association list 32, based on the human-relations information extracted by the human-relations information extraction member 28 for a recipient to whom an email is to be sent. For example, when preparing an email to the communication partner A (senior-junior degree=0.12, friendliness degree=−0.28, business degree=0.52), a character conversion dictionary "c.dic" (senior-junior degree>0.1, business degree>0.5) is selected. When preparing an email to the communication partner B (senior-junior degree=0.36, friendliness degree=0.22, business degree=0.08), a character conversion dictionary "d.dic" (friendliness degree>0.2, business degree<0.1) is selected.

Note that the human-relations information storing section 17 stores human-relations information produced by the email preparation assisting device 10 of the first embodiment (specifically, the human-relations information producing member 16 shown in FIG. 1). This has already been described above, and will not be further described below.

The input character conversion member 35 converts a character or character string to an intended character or character string by using the character conversion dictionary selected by the dictionary selection member 33. Specifically, the input character conversion member 35 performs a so-called "input predictive character conversion", in which when a "reading" is given, a character or character string that matches the "reading" in a prefix search is selected as a conversion candidate. This operation is performed while reflecting the usage frequencies of terms stored in the stored term list 34 with respect to the recipient to whom the email being prepared is addressed so that terms having relatively higher usage frequencies for emails that have been sent to the recipient or received therefrom appear in relatively upper places. Then, by selecting an intended one of conversion candidates displayed by the input character conversion member 35 via the user input/output section 31, the user can confirm a converted character string and insert it in the email being prepared. Note that the stored term list 34 is similar to the information stored in the term usage frequency storing section 14 described above in the first embodiment.

FIG. 17 shows examples of conversion candidates displayed by the input character conversion member 35. The figure shows an example of conversion candidates in response to an user input of the character "yo" for the communication partner A (senior-junior degree=0.12, friendliness degree=−0.28, business degree=0.52) and that for the communication partner B (senior-junior degree=0.36, friendliness degree=0.22, business degree=0.08). Among the conversion candidates for the communication partner A, "yoroshiku onegai shimasu (your cooperation is much appreciated)" comes at the top. Among the conversion candidates for the communication partner B, "yoroshiku (thanks in advance)" comes at the top. For each recipient, terms more frequently used with that recipient appear in upper places among the conversion candidates.

As described above, according to the present embodiment, it is possible to select the most suitable character conversion dictionary for the recipient to whom an email is to be sent, based on the human-relations information stored in the human-relations information storing section 17. By reflecting the usage frequencies of the terms stored in the stored term list 34, terms more frequently used for the recipient to whom the email is to be sent can be made to appear in upper places among the conversion candidates. This improves the character string conversion accuracy while reducing the burden on the user of preparing an email, particularly the burden on the user of inputting characters.

Note that the email preparation assisting device 30 does not need to include the character conversion dictionary association list 32, the human-relations information storing section 17 and the stored term list 34. Alternatively, these components may be provided as external storage devices.

The email preparation assisting device 30 does not need to include all of the dictionary selection member 33 and the input character conversion member 35. These components can be omitted without detracting from the effects of the present invention. The input character conversion member 35 is effective not only when preparing an email but also when, for example, preparing a document for a particular recipient. A communication partner and a character conversion dictionary may be associated with each other in one-to-one correspondence.

While the email preparation assisting devices 20 and 30 of the second and third embodiments are provided by adding new components to the email preparation assisting device 10 of the first embodiment, they do not need to include all the components of the email preparation assisting device 10. Specifically, the human-relations information stored in the human-relations information storing section 17 may be information produced by member other than the email preparation assisting device 10 or may of course be information input by the user themselves. The human-relations information may be separated for different categories such as "superiors" and "friends".

The conventional phrase producing member 23, the term appropriateness determination member 25, the decoration information producing member 27 and the dictionary selection member 33 described above in the second and third embodiments are merely illustrative of the assisting member of the present invention for assisting in preparing emails based on the human-relations information extracted by the human-relations information extraction member 28. Therefore, the assisting member of the present invention is not limited to specific member described above.

Figure 18:
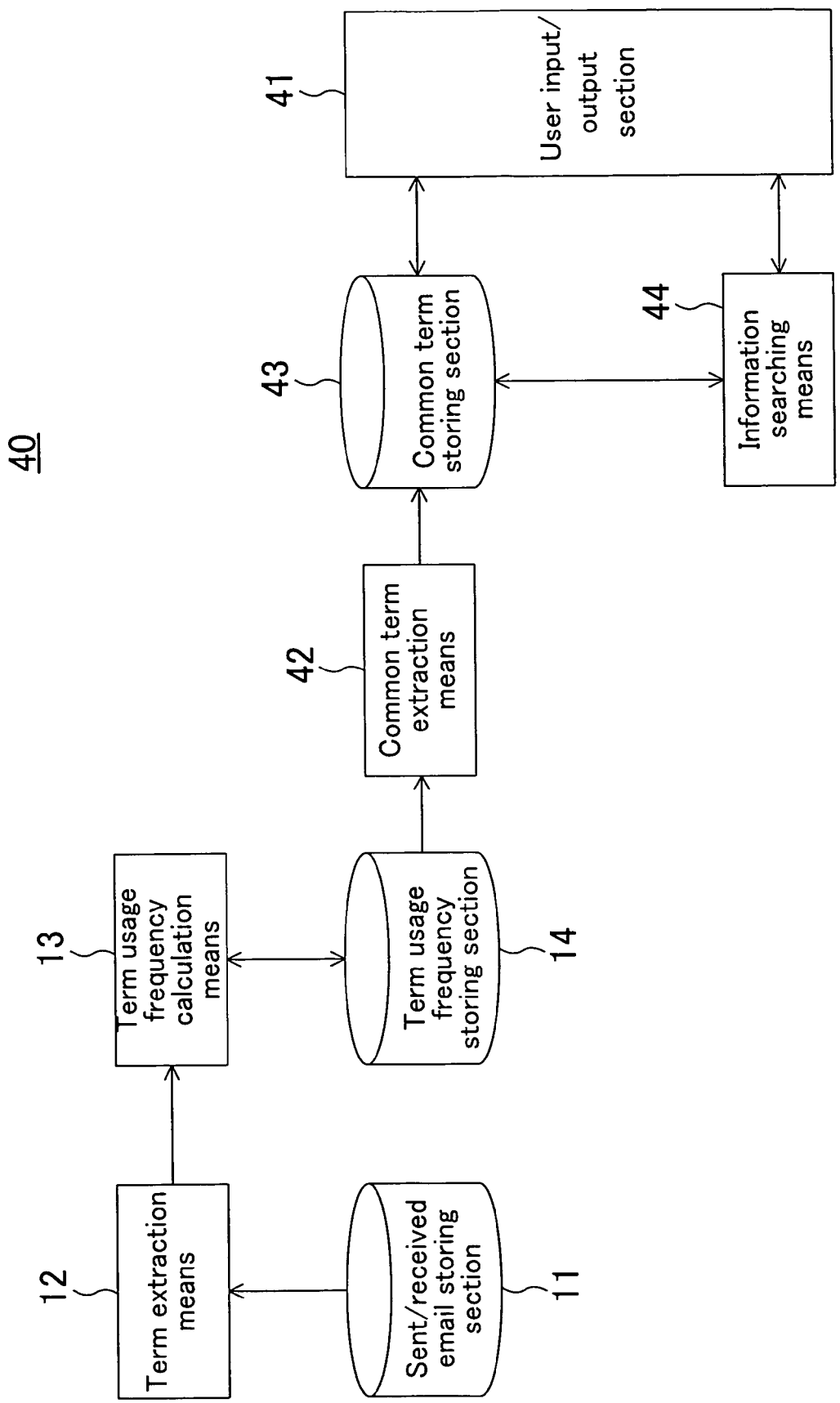
FIG. 18 is a diagram showing a configuration of an email preparation assisting device according to a fourth embodiment of the present invention.

FIG. 18 shows a configuration of an email preparation assisting device according to a fourth embodiment of the present invention. An email preparation assisting device 40 of the present embodiment includes a user input/output section 41 for receiving inputs from the user and presenting a display to the user, the sent/received email storing section 11 for storing sent/received emails, the term extraction member 12 for extracting terms from the emails stored in the sent/received email storing section 11, the term usage frequency calculation member 13 for calculating the usage frequency of each term extracted by the term extraction member 12, the term usage frequency storing section 14 for storing the usage frequency of each term calculated by the term usage frequency calculation member 13, common term extraction member 42 for extracting common terms for a communication partner based on the usage frequency of each term stored in the term usage frequency storing section 14, a common term storing section 43 for storing the common terms extracted by the common term extraction member 42, and information searching member 44 for searching information stored inside or outside the email preparation assisting device 40 by using each term stored in the common term storing section 43. The common term extraction member 42 and the information searching member 44 can be realized by means of either hardware or software. Note that the sent/received email storing section 11, the term extraction member 12, the term usage frequency calculation member 13 and the term usage frequency storing section 14 are similar to those of the first embodiment, and will not be further described below.

Figures 19, 20:
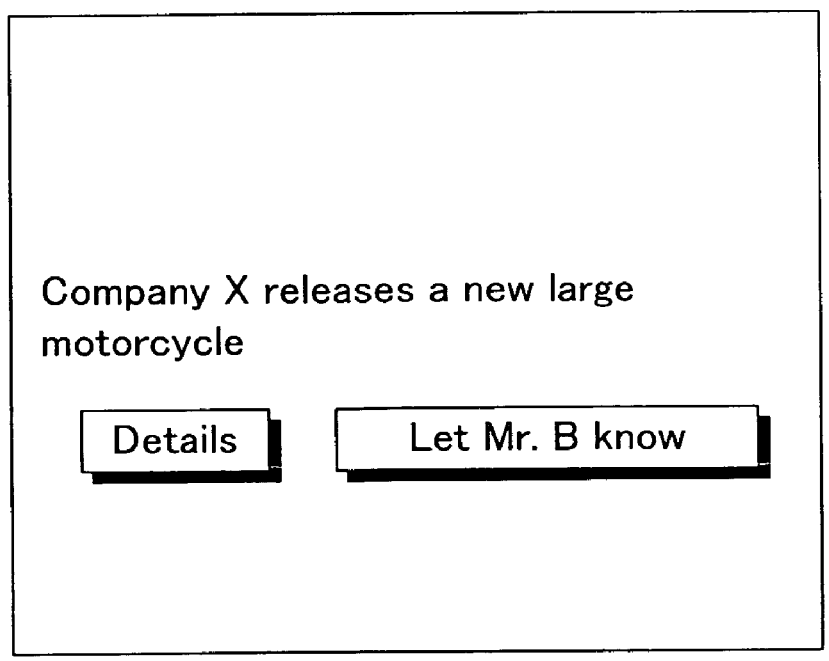
FIG. 19 shows an example of information stored in a common term storing section.
FIG. 20 shows an example of what is displayed when a user input/output section makes a suggestion to prepare an email.

Based on the term usage frequency stored in the term usage frequency storing section 14, the common term extraction member 42 divides the usage frequency of each term used commonly in sent emails and in received emails for each communication partner by the total usage frequency of the terms extracted from the sent emails and the received emails to obtain a value as the usage rate, i.e., the degree of commonness, of the term. Each term whose degree of commonness is equal to or greater than a predetermined value is stored in the common term storing section 43 as a common term. FIG. 19 shows an example of information stored in the common term storing section 43. Note that the operation performed by the common term extraction member 42 corresponds to the common term extraction step.

The user input/output section 41 accepts a user operation for preparing an email. The information searching member 44 is activated in response to a request from the user to search for information that would interest a recipient to whom an email is to be sent.

The information searching member 44 retrieves from the common term storing section 43 common terms for the recipient to whom an email is to be sent, and searches an external news site via a network (not shown) using a common term or a combination of common terms as a search condition. A common term is a term frequently used by the user and the recipient to whom an email is to be sent, and it can be assumed that the common term reflects things that would interest the recipient. If the information searching member 44 obtains some information as a result of the search operation, the information searching member 44 displays the search result to the user via the user input/output section 41. Note that the operation performed by the information searching member 44 corresponds to the information searching step.

The user input/output section 41 activates the information searching member 44 in response to a request from the user for a normal information search. In this case, the information searching member 44 searches an external news site via a network (not shown) using a search condition input by the user themselves. If the information obtained as a result of the search operation contains a common term stored in the common term storing section 43, the information searching member 44 suggests the user to prepare an email for notifying another user who frequently uses the common term of that obtained information. FIG. 20 shows an example of what is displayed when the user input/output section 41 makes a suggestion to prepare an email. The user can select a button "Let Mr. B know" shown in FIG. 20 to prepare an email for notifying the recipient B of the search result. Note that the time at which the suggestion to prepare an email is made may be when the search result is obtained or when the user switches to another screen after obtaining the search result.

As described above, according to the present embodiment, it is possible to easily obtain information about common topics from the common terms for a communication partner to whom an email is to be sent, and it is possible to assist in preparing an email body text while utilizing the obtained information.

Note that while an external news site is used as the information search range in the present embodiment, the present invention is not limited thereto. Other types of information such as recipe information and book information may be searched. Instead of searching an external information source, a database inside the email preparation assisting device 40 may be searched.

While the usage frequency of a term commonly used in sent emails and in received emails is used as the degree of commonness of the common term in the present embodiment, a term that appears frequently in either sent emails or received emails may be used as a common term. This is because a term that appears frequently in either sent emails or received emails is a term that is frequently seen by the parties exchanging the emails, and in that regard such a term can be considered a common term between the parties.

The calculation of the degree of commonness of a common term may take into consideration the response rate at which the communication partner responds or the response time in which the communication partner responds. For example, where the response rate is taken into consideration, the degree of commonness is calculated to be higher as the response rate is higher and as the response time is shorter. Thus, it is possible to further increase the precision of the degree of commonness of a common term.

Figures 21, 22:
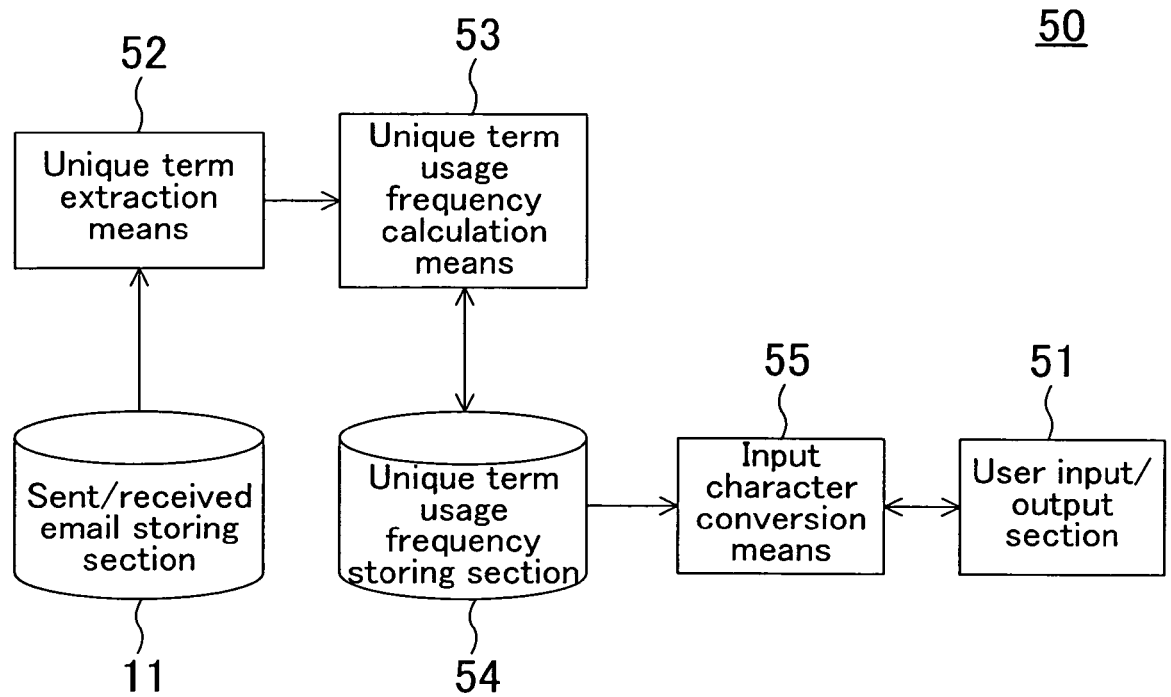
FIG. 21 is a diagram showing a configuration of an email preparation assisting device according to a fifth embodiment of the present invention.
FIG. 22 shows an example of information stored in a unique term usage frequency storing section.

FIG. 21 shows a configuration of an email preparation assisting device according to a fifth embodiment of the present invention. An email preparation assisting device 50 of the present embodiment includes a user input/output section 51 for receiving inputs from the user and presenting a display to the user, the sent/received email storing section 11 for storing sent/received emails, unique term extraction member 52 for extracting, from the emails stored in the sent/received email storing section 11, a unique term that is not registered in a dictionary used by the email preparation assisting device 50, unique term usage frequency calculation member 53 for calculating the usage frequency of each unique term extracted by the unique term extraction member 52, a unique term usage frequency storing section 54 for storing the usage frequency of each term calculated by the unique term usage frequency calculation member 53, and an input character conversion member 55 for outputting a conversion candidate in response to a character input. The unique term extraction member 52, the unique term usage frequency calculation member 53 and the input character conversion member 55 can be realized by means of either hardware or software. Note that the sent/received email storing section 11 is similar to that of the first embodiment, and will not be further described below.

The user input/output section 51 accepts a user operation for preparing an email. The input character conversion member 55 is activated in response to a character input.

Unlike the term extraction member 12 shown in FIG. 1, the unique term extraction member 52 extracts, from emails stored in the sent/received email storing section 11, unique terms that are not registered in a dictionary used by the email preparation assisting device 50. Where terms are extracted by an ordinary method such as a morphemic analysis or parsing, for example, terms that are absent in the dictionary for analysis and thus are treated as undefined words are extracted as unique terms. Note that the operation performed by the unique term extraction member 52 corresponds to the unique term extraction step.

The unique term usage frequency calculation member 53 calculates the usage frequency of each unique term extracted by the unique term extraction member 52, and cumulatively adds it to the usage frequency of the unique term already stored in the unique term usage frequency storing section 54, and the operation thereof corresponds to the unique term usage frequency calculation step. If there is no history of the unique term being used, the unique term is newly added. FIG. 22 shows an example of information stored in the unique term usage frequency storing section 54. The usage frequency of each unique term is a cumulative value from when the calculation of the usage frequency of the unique term was started to present. Note that the usage frequency of a unique term can be initialized. Thus, if the human relations between the user and a communication partner changes, for example, new unique term information can be created anew by newly cumulatively adding, and storing, usage frequencies of unique terms.

The input character conversion member 55 converts a character or character string input by the user to an intended character or character string by referring to the unique term usage frequency storing section 54. Specifically, the input character conversion member 55 performs a so-called "input predictive character conversion", in which when a "reading" is given, a character or character string that matches the "reading" in a prefix search is selected as a conversion candidate. This operation is performed while reflecting the usage frequencies of unique terms stored in the unique term usage frequency storing section 54 with respect to the recipient to whom the email being prepared is addressed so that unique terms having relatively higher usage frequencies for emails sent to the recipient or received therefrom appear in relatively upper places. Then, by selecting an intended one of conversion candidates displayed by the input character conversion member 55 via the user input/output section 51, the user can confirm a converted character string and inserts the unique term in the email being prepared.

As described above, according to the present embodiment, in the input character conversion when preparing an email, a unique term that is not registered in the dictionary but is frequently used between the user and the recipient to whom the email is to be sent can be used as a conversion candidate. Thus, it is possible to facilitate the input of unique terms, which has been time-consuming in the prior art.

Note that the email preparation assisting device of the present invention can be realized by, for example, installing an email preparation assisting program on a computer, or the like, via a recording medium or non transient computer readable medium such as a CD-ROM or a communications medium such as the Internet.

While the embodiments have been described above with respect to an example where an email is sent to a single recipient, the email preparation assisting device of the present invention can also be used for applications where the same content is sent to many people at once, e.g., invitation letters, New Year's cards, direct mail, and the like. In such a case, the email preparation assisting device of the present invention converts sentences input by the user to an appropriate style of writing according to the recipients. This reduces the burden on the user of converting the style of writing.

As described above, according to the present invention, it is possible to automatically produce, from electronic text data of a communications history with a recipient, the human-relations information for the recipient, the common term information representing common topics with the recipient, the information of unique terms used between the user and the recipient. By using the produced human-relations information, common term information and unique term information, it is possible to provide a most suitable assistance in suggesting additional information, determining the appropriateness of the terms being used, searching information about common topics, inputting unique terms, etc., according to the recipient to whom an email is to be sent. As for the input character conversion, it is possible to improve the character conversion accuracy by reflecting the usage frequencies of common terms and unique terms that are frequently used in communications with the recipient. With these features, it is possible to reduce the burden on the user of preparing an email.

As described above, a device, a program and a method for assisting in preparing an email of the present invention provide effects such as the reduction in the burden on the user of preparing an email, and are particularly useful in cases where an email is prepared with a portable telephone or a portable terminal having a less convenient character input function.

What is claimed is:

1. An email preparation assisting device for assisting a sender of an email prepare a new email message to a recipient, comprising:
   a non transient computer readable medium having embedded therein:
   a term extraction member for extracting a term from email messages of a communications session between the recipient and the sender, the email messages including email messages sent to the recipient and email messages received from the recipient;
   a term usage frequency calculation member for calculating a usage frequency of each term in the email messages of the communication session that was extracted by the term extraction member; and
   a human-relations information producing member that determines a human relationship between the sender and the recipient using a term association list and the usage frequencies of the extracted terms, in which each term in the term association list is associated with human-relations basic information defined by at least one of measures of a senior-junior degree, a friendliness degree, and a business degree;
   wherein when a new communications session is performed with the recipient, the term usage frequency calculation member calculates a usage frequency, in an email message of the new communications session, of each term extracted by the term extraction member from the email message, and adds the calculation result to the usage frequency of the term thus far; and
   the human-relations information producing member
   (a) uses the term association list to perform:
      i) a first weighting operation where the human-relations basic information associated with the term extracted by the term extraction member from the email messages sent to the recipient is weighted with the calculated usage frequency of the term, and
      ii) a second weighting operation where human-relations basic information associated with the term extracted by the term extraction member from the email messages received from the recipient is weighted with the calculated usage frequency of the term, and
   (b) produces human-relations information of the senior-junior degree obtained from a difference between the results of the first and second weighting operations.

2. An email preparation assisting device for assisting a sender of an email prepare a new email message to a recipient, comprising:
   a non transient computer readable medium having embedded therein:
   term extraction member for extracting a term from email messages of a communications session with between the recipient and the sender, the email messages including email messages sent to the recipient and email messages received from the recipient;
   a term usage frequency calculation member for calculating a usage frequency, of each term in the email messages of the communication session that was extracted by the term extraction member;
   a human-relations information producing member that determines a human relationship between the sender and the recipient using a term association list and the usage frequencies of the extracted terms, in which each term in the term association list is associated with human-relations basic information defined by at least one of measures of a senior-junior degree, a friendliness degree, and a business degree;
   a term usage frequency storing section for storing, separately for each communication recipient, the usage frequency of each term calculated by the term usage frequency calculation member while associating the usage frequency with the term; and
   a human-relations information storing section for storing, separately for each communication recipient, the human-relations information produced by the human-relations information producing member;
   wherein the human-relations information producing member
   (a) uses the term association list to perform:

i) a first weighting operation where the human-relations basic information associated with the term extracted by the term extraction member from the email messages sent to the recipient is weighted with the calculated usage frequency of the term and ii) a second weighting operation where human-relations basic information associated with the term extracted by the term extraction member from the email messages received from the recipient is weighted with the calculated usage frequency of the term calculated by the term usage frequency calculation member, and (b) produces the human-relations information of the senior-junior degree obtained from a difference between the results of the first and second weighting operations.

3. The email preparation assisting device of one of claims 1 and 2, comprising:

human-relations information extraction member for extracting human-relations information for a recipient to whom the email is to be sent, from the human-relations information produced by the human-relations information producing member and stored separately for each communication recipient; and assisting member for assisting in preparing the email to the recipient based on the human-relations information extracted by the human-relations information extraction member.

4. The email preparation assisting device of claim 3, wherein the assisting member refers to an additional information association list in which a conventional phrase, decoration information and other additional information to be added to the email are each associated with a condition about at least one of the measures to suggest additional information that is associated with the condition satisfied by the human-relations information extracted by the human-relations information extraction member.

5. The email preparation assisting device of claim 3, wherein the assisting member refers to a term association list in which each term is associated with human-relations basic information defined by at least one of the measures to calculate a distance between the human-relations basic information associated with each term included in a prepared email and the human-relations information extracted by the human-relations information extraction member so as to determine appropriateness of the term included in the prepared email based on a magnitude relationship between the distance and a predetermined threshold value.

6. The email preparation assisting device of claim 3, wherein the assisting member refers to a character conversion dictionary association list in which each character conversion dictionary is associated with a condition about at least one of the measures to select a character conversion dictionary associated with the condition satisfied by the human-relations information extracted by the human-relations information extraction member.

7. A non-transient computer readable medium having embedded therein computer executable instructions for an email preparation assisting computer program for controlling a computer to assist a sender of an email prepare a new email message to a recipient, the computer program comprising:

a term extraction means for extracting a term from email messages of a communications session between the recipient and the sender, the email messages including email messages sent to the recipient and email messages received from the recipient; with a recipient to whom the email is to be sent;

a term usage frequency calculation means for calculating a usage frequency of each term in the email messages of the communication session that was extracted by the term extraction means; and a human-relations information producing means that determines a human relationship between the sender and the recipient using a term association list and the term frequencies of the extracted terms, in which each term in the term association list is associated with human-relations basic information defined by at least one of measures of a senior-junior degree, a friendliness degree, and a business degree;

wherein when a new communications session is performed with the recipient, the term usage frequency calculation means calculates a usage frequency, in an email message of the new communications session, of each term extracted by the term extraction means from the email message, and adds the calculation result to the usage frequency of the term thus far, and the human-relations information producing means (a) uses the term association list to perform:

i) a first weighting operation where the human-relations basic information associated with the term extracted by the term extraction means from the email messages sent to the recipient is weighted with the usage frequency calculated by the term usage frequency calculation means and ii) a second weighting operation where the human-relations basic information associated with the term extracted by the term extraction means from the email messages received from the recipient is weighted with the usage frequency calculated by the term usage frequency calculation means, and (b) produces human-relations information of the senior-junior degree obtained from a difference between the results of the first and second weighting operations.

8. A non-transient computer readable medium having embedded therein computer executable instructions for an email preparation assisting computer program for controlling a computer to assist a sender of an email prepare a new email message to a recipient, the computer program comprising:

a term extraction means for extracting a term from email messages of a communications session between the recipient and the sender, the email messages including email messages sent to the recipient and email messages received from the recipient; with a recipient to whom the email is to be sent;

a term usage frequency calculation means for calculating a usage frequency of each term in the email messages of the communication session that was extracted by the term extraction means;

a human-relations information producing means that determines a human relationship between the sender and the recipient using a term association list and the term frequencies of the extracted terms, in which each term in the term association list is associated with human-relations basic information defined by at least one of measures of a senior-junior degree, a friendliness degree, and a business degree, to determine a human relationship between the sender and the recipient;

a term usage frequency storing means for storing, separately for each communication recipient, the usage frequency of each term calculated by the term usage frequency calculation means while associating the usage frequency with the term; and a human-relations information storing means for storing, separately for each communication recipient, the human-relations information produced by the human-relations information producing means;

wherein the human-relations information producing means (a) uses the term association list to perform:
   ii) a first weighting operation where the human-relations basic information associated with the term extracted by the term extraction means from the email messages sent to the recipient is weighted with the usage frequency calculated by the term usage frequency calculation means and
   ii) a second weighting operation where the human-relations basic information associated with the term extracted by the term extraction means from the email messages received from the recipient is weighted with the usage frequency calculated by the term usage frequency calculation means, and (b) produces the human-relations information of the senior-junior degree obtained from a difference between the results of the first and second weighting operations.

9. The email preparation assisting device of claim 1, wherein human-relations information producing member analyzes a plurality of emails from the sender to the recipient and a plurality of return emails from the recipient to the sender to determine the senior-junior degree, the friendliness degree, and the business degree between the sender and the recipient and further assigns a numerical value to each of the senior-junior degree, the friendliness degree, and the business degree in response to the determined results.

10. The email preparation assisting device of claim 1, wherein the term extraction member extracts each appearance, of at least one term in the term association list, from historical emails from the first person to the second person and historical emails from the second person to the first person;

wherein the term usage frequency calculation member determines the usage frequency for the at least one term in the historical emails based on the extraction result from the term extraction member for the at least one term;

wherein the human-relations information producing member determines the human relationship between the first person and the second person based on the at least one term and the usage frequency for the at least one term in the historical emails.

* * * * *

UNITED STATES PATENT AND TRADEMARK OFFICE
CERTIFICATE OF CORRECTION

PATENT NO. : 7,788,327 B2
APPLICATION NO. : 11/137984
DATED : August 31, 2010
INVENTOR(S) : Eiichi Naito et al.

It is certified that error appears in the above-identified patent and that said Letters Patent is hereby corrected as shown below:

On the title page under item (75), the city of residence of inventor Eiichi Naito should read -- Kyoto --

Signed and Sealed this

Twenty-first Day of December, 2010

David J. Kappos
*Director of the United States Patent and Trademark Office*